United States Patent
Haka

(10) Patent No.: US 7,101,301 B2
(45) Date of Patent: Sep. 5, 2006

(54) TWO-SPEED TRANSFER CASE WITH CENTER DIFFERENTIAL

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 84 days.

(21) Appl. No.: 10/738,565

(22) Filed: Dec. 17, 2003

(65) Prior Publication Data
US 2004/0180749 A1 Sep. 16, 2004

Related U.S. Application Data

(60) Provisional application No. 60/454,372, filed on Mar. 13, 2003.

(51) Int. Cl.
*F16H 3/44* (2006.01)
*B01D 25/00* (2006.01)

(52) U.S. Cl. .................. 475/269; 475/311; 210/224

(58) Field of Classification Search ................ 475/210, 475/222–4, 269, 311–2, 314
See application file for complete search history.

(56) References Cited

U.S. PATENT DOCUMENTS

| | | | | |
|---|---|---|---|---|
| 3,963,085 A | * | 6/1976 | Vinton | 475/225 |
| 4,349,091 A | | 9/1982 | Miyake et al. | 192/53 F |
| 4,458,557 A | * | 7/1984 | Hayakawa | 475/116 |
| 4,673,072 A | * | 6/1987 | Hosono et al. | 192/3.57 |
| 4,805,484 A | * | 2/1989 | Hiraiwa | 475/250 |
| 5,409,429 A | * | 4/1995 | Showalter et al. | 475/295 |
| 6,062,361 A | * | 5/2000 | Showalter | 192/38 |
| 6,464,612 B1 | * | 10/2002 | Frost | 475/288 |
| 6,588,559 B1 | * | 7/2003 | Blair | 192/20 |
| 2001/0036879 A1 | * | 11/2001 | Brown et al. | 180/249 |

FOREIGN PATENT DOCUMENTS

EP 1462291 A2 * 9/2004

* cited by examiner

*Primary Examiner*—Roger Pang
(74) *Attorney, Agent, or Firm*—Christopher DeVries

(57) ABSTRACT

A simple planetary gear arrangement is provided for a transfer case. The transfer case includes a carrier connected to the transfer case input. The ring gear is connected with a rear axle. The sun gear is connectable with a front axle through a clutching arrangement including a one-way clutch and a dog clutch in parallel. The one-way clutch and the dog clutch are independently engageable. The sun gear is selectively groundable through a friction clutch. Accordingly, the simple planetary gear set functions as a gear ratio producing device when the friction clutch is engaged, and as a center differential when the dog clutch or one-way clutch is engaged.

11 Claims, 3 Drawing Sheets

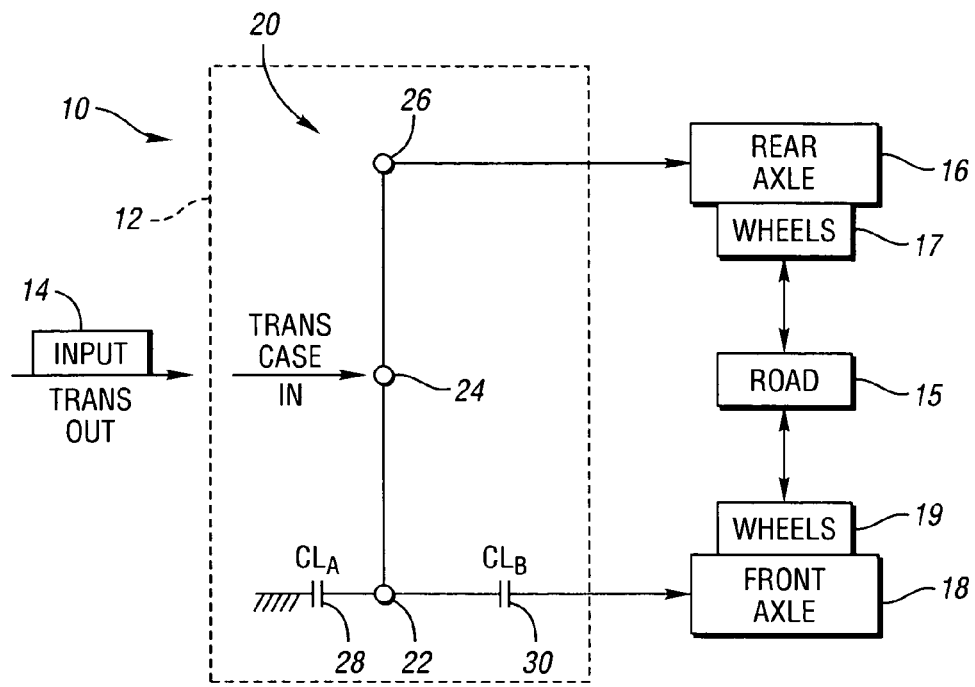
FIG. 1
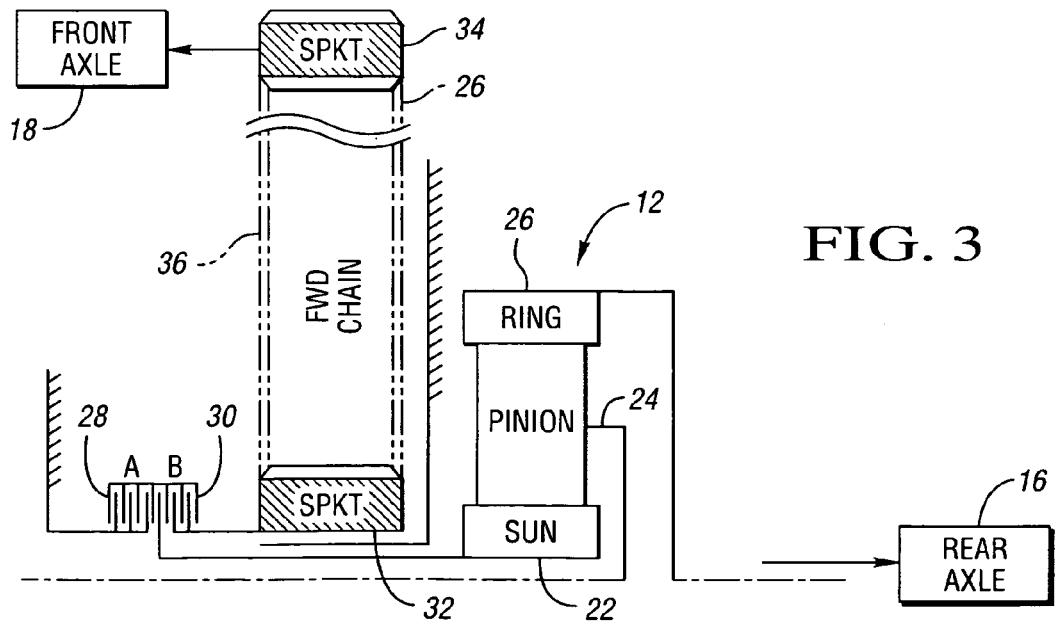
FIG. 2
FIG. 3

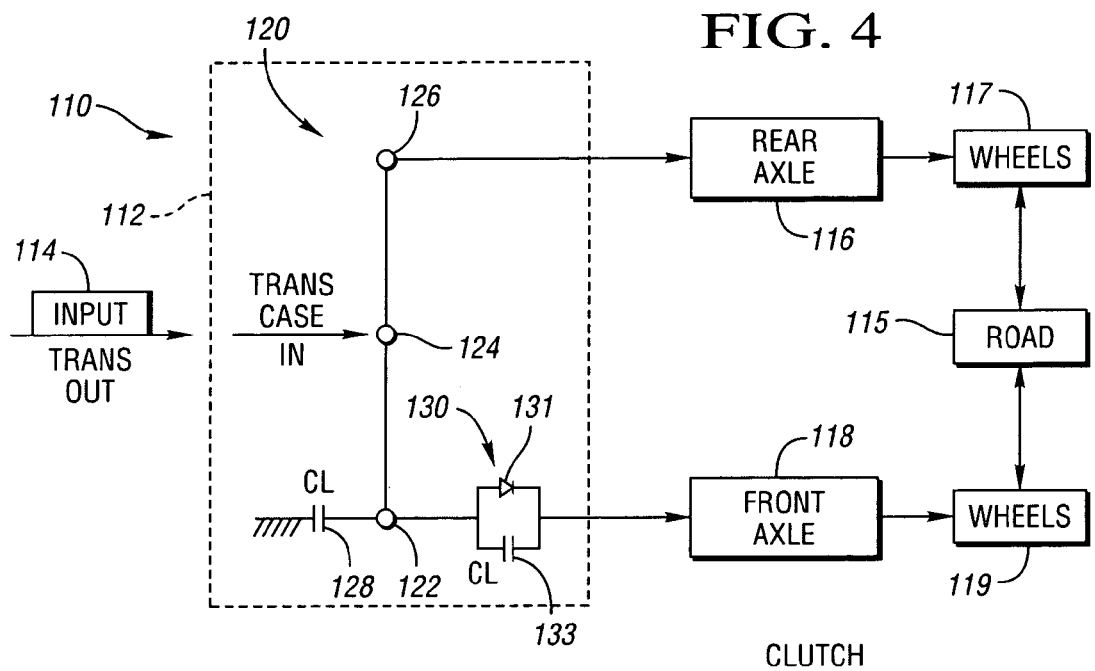
FIG. 4
FIG. 5
|  | | CLUTCH | | |
|---|---|---|---|---|
|  | | 128 | 133 | 131 |
| SPEED | DIRECT AWD (SPEEDS 1-4) | O | O | X |
|  | OVERDRIVE (5th SPEED) | X | O | O |
|  | PARK/REVERSE AWD | O | X | O |
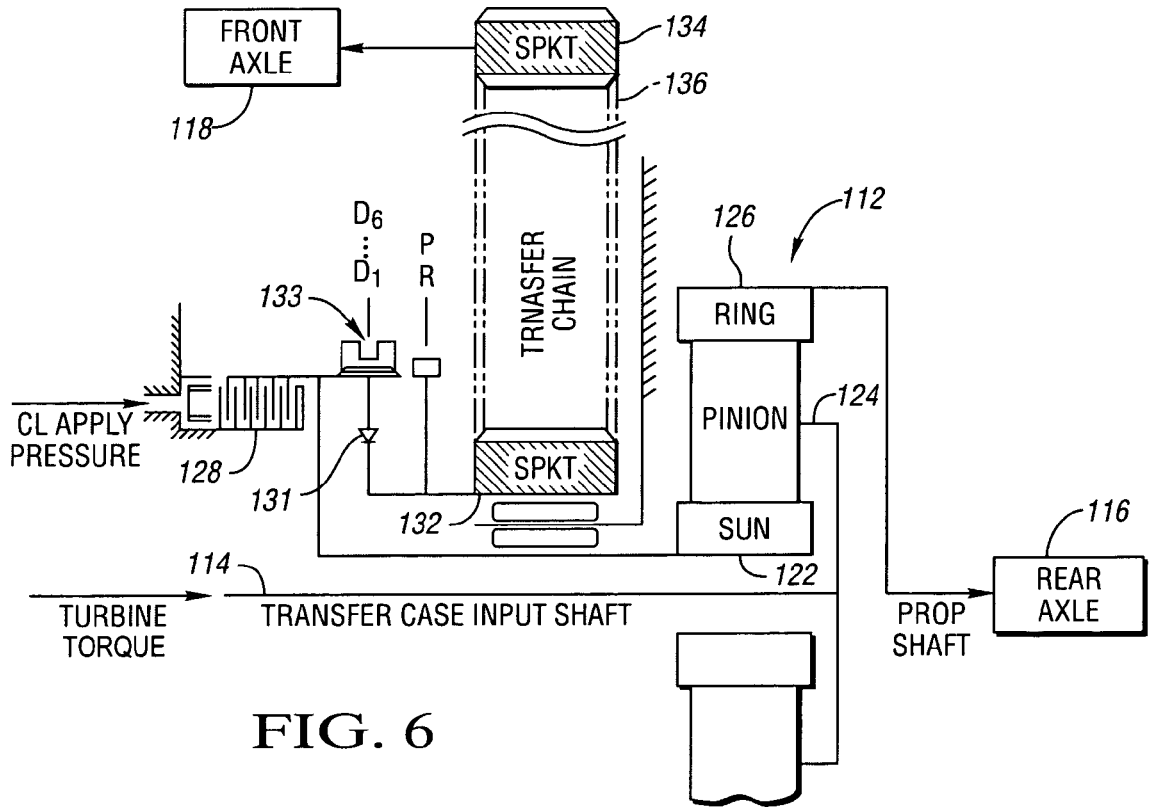
FIG. 6

TWO-SPEED TRANSFER CASE WITH CENTER DIFFERENTIAL

CROSS-REFERENCE TO RELATED APPLICATION

This application claims the benefit of U.S. Provisional Application 60/454,372 filed Mar. 13, 2003, which is hereby incorporated by reference in its entirety.

TECHNICAL FIELD

The invention relates to a two-speed transfer case including a simple planetary gear set which functions as both a gear ratio producing device and as a center differential.

BACKGROUND OF THE INVENTION

Four-wheel drive (4WD) vehicles provide traction which is often unattainable in two-wheel drive (2WD) vehicles by delivering power to both of the vehicle's axles. Attendant with the added traction provided by four-wheel drive is the added complexity of the drive train required to control and deliver power to all four wheels as opposed to only two wheels. Four-wheel drive characteristically does not have a center differential which would maintain a fixed fraction of torque delivered to each axle, but rather maintains the same speed at each axle regardless of the torque split. The delivery of power between the front wheels and the rear wheels of the vehicle is typically handled by a transfer case mechanism which usually includes either a mechanically or electronically controlled clutch to switch between rear-wheel drive and four-wheel drive.

In all-wheel drive (AWD) systems, the front and rear axles are continually in driving engagement with the transfer case, but the system contains a center differential to maintain a fixed ratio of torque between the front and rear axle.

In addition to controlling the transfer of torque between front and rear axles of a vehicle, the transfer case may also include a planetary gear set or set of countershaft gears which provides an underdrive or overdrive ratio. Further, rather than manufacturing a new five- or six-speed transmission, an existing four-speed transmission may be used with a transfer case to provide additional speed ratios, such as for stump pulling (extreme underdrive), or in a top gear-overdrive condition.

SUMMARY OF THE INVENTION

The present invention contemplates the use of a simple planetary gear set in a transfer case which functions both as a gear ratio producing device and as a center differential.

More specifically, the invention provides a simple planetary gear arrangement for a transfer case, including a carrier connected to an input (i.e., the output from the transmission), and a ring gear in driving engagement with a rear axle. The sun gear is connectable with the front axle through a clutching arrangement including a one-way clutch and a dog clutch in parallel. The one-way clutch and dog clutch are independently engageable. The sun gear is selectably groundable (i.e., connectable to a transfer case housing) through a friction clutch. The simple planetary gear set functions as a gear ratio producing device when the friction clutch is engaged, and as a center differential when the dog clutch or one-way clutch is engaged. An overdrive ratio produced by engagement of the friction clutch is approximately 1.5:1, for example.

The clutching arrangement of the sun gear to the front axle, including the one-way clutch and dog clutch, could be replaced by a single clutch.

Another aspect of the invention provides a drive train for a vehicle including front and rear axles, and a transfer case. The transfer case includes a planetary gear set, including a ring gear, carrier, and sun gear. The carrier is continuously connected with an input; the ring gear is continuously connected with the rear axle; and the sun gear is selectively connectable with the front axle through a clutching arrangement. The sun gear is also selectively connectable with ground through a friction clutch. The simple planetary gear set functions as a gear ratio producing device when the friction clutch is engaged, and as a center differential when the clutching arrangement is engaged as a result of the connection of the rear axle with the front axle through a road surface upon which wheels supported by the front and rear axles rest.

The above features and advantages, and other features and advantages of the invention, are readily apparent from the following detailed description of the best mode for carrying out the invention when taken in connection with the accompanying drawings.

BRIEF DESCRIPTION OF THE DRAWINGS

FIG. 1 shows a lever diagram of a two-speed transfer case in accordance with the invention;

FIG. 2 shows a truth table for the lever diagram of FIG. 1;

FIG. 3 shows a schematic stick diagram of the assembly represented by the lever diagram of FIG. 1;

FIG. 4 shows a lever diagram of a two-speed transfer case in accordance with an alternative embodiment of the invention;

FIG. 5 shows a truth table for the lever diagram of FIG. 4;

FIG. 6 shows a schematic stick diagram of an assembly embodying the lever diagram of FIG. 4.

DESCRIPTION OF THE PREFERRED EMBODIMENTS

Figure 7:
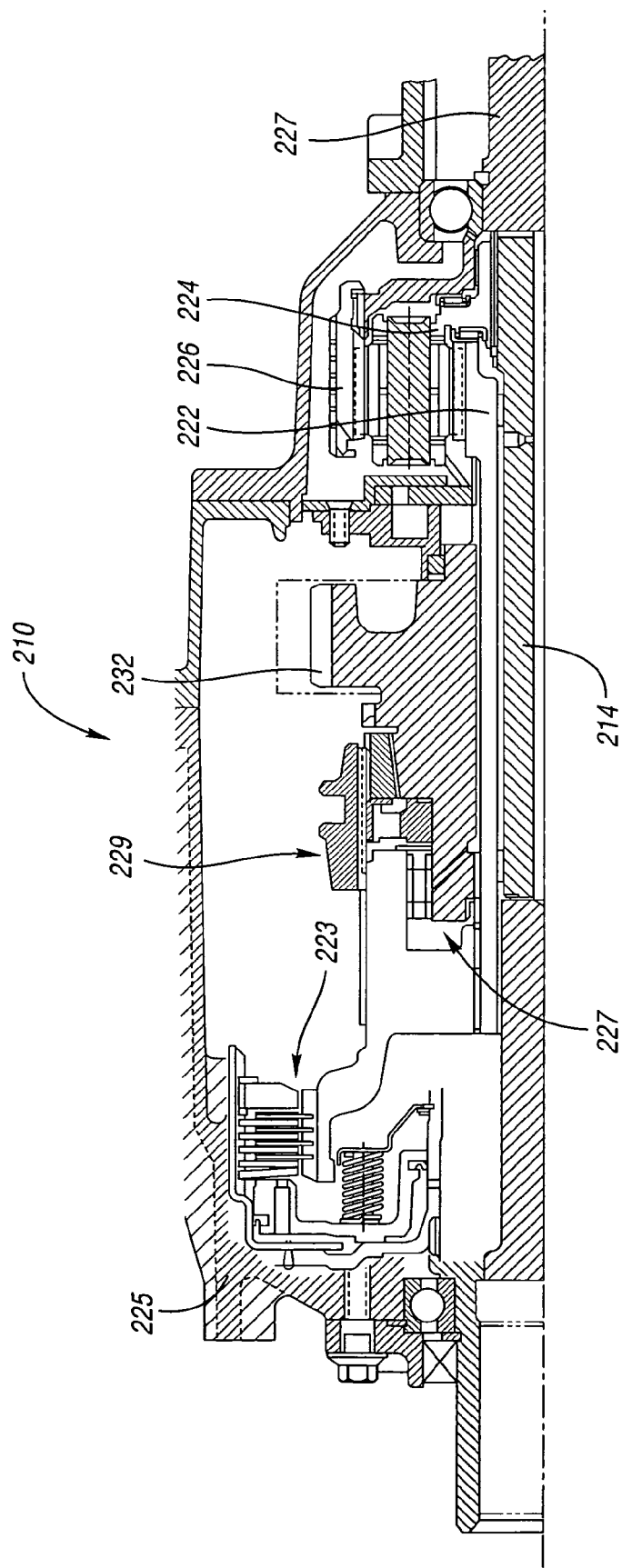
FIG. 7 shows a partial longitudinal cross-sectional view of a transfer case corresponding with the embodiment of FIGS. 4–7.

The present invention allows a simple planetary gear set in a transfer case to function as both a gear ratio producing device and a center differential. These two conditions do not occur simultaneously. In the direct drive mode, the torque is split approximately 33% front axle and 67% rear axle, based on the ring gear to sun gear tooth ratio of the planetary gear set, and in the overdrive mode all of the torque goes to the rear axle.

In order to minimize the number of clutching elements, it is necessary to make the gear ratios direct (1:1) and overdrive (approximately 1.5:1). In the preferred embodiments, the planetary gear set is a simple gear set with the transfer case input (i.e., the transmission output) continuously connected to the planet carrier, and the ring gear continuously connected to the rear axle. The sun gear is switched between a connection to ground (to create overdrive to the rear axle) and connection to the front axle (for a ⅓ to ⅔, approximately, front to rear axle torque ratio open center differential). The planetary gear set is "locked up in the direct torque ratio" by the connection of the rear axle to the front axle through the road. Because the transfer case includes a dynamic shift (a friction clutch is used for the direct to overdrive ratio change), the assembly achieves the addition of one or two forward gear ratios. One additional ratio is produced when the transmission is in top gear and the transfer case shifts from direct to overdrive. A second additional ratio can be achieved by switching the transfer case from direct to overdrive when the transmission is in first gear. This results in an additional ratio between first and second gear.

FIG. 1 shows a lever diagram for a two-speed transfer case in accordance with the invention. The transfer case 12 receives its input 14 from the output of a corresponding transmission, and transmits torque to the rear axle 16 and front axle 18, selectively.

As shown, the lever diagram for the simple planetary gear set 20 of the transfer case 12 includes a sun gear node 22, a planet carrier node 24, and a ring gear node 26. The input 14 is continuously connected to the carrier 24, and the ring gear 26 is continuously connected to the rear axle 16.

The sun gear 22 is selectively connectable with ground (i.e., a transmission housing or transfer case housing) through clutch "A" 28, or alternatively connectable with the front axle 18 through clutch "B" 30.

FIG. 2 shows a truth table indicating the conditions in which clutches "A" and "B" 28, 30 are engaged. In two-wheel drive high (overdrive), clutch "A" 28 is engaged and clutch "B" 30 is disengaged. Accordingly, the sun gear 22 is grounded, and the rear axle 16 rotates faster than the input 14. In the direct drive condition of all-wheel drive low, clutch "B" 30 is engaged, and clutch "A" 28 is disengaged. In this configuration, torque from the input 14 is split between the rear and front axles 16, 18 with 33% of the torque going to the front axle 18 and 67% of the torque going to the rear axle 16 based on the proposed ring gear to sun gear tooth ratio of 70:30.

FIG. 3 shows a schematic stick diagram which embodies the structure of the lever diagram of FIG. 1, wherein like reference numerals are used to refer to like components from FIG. 1. As illustrated, the sprocket 32 carries torque from the clutch 30 to the front axle 18 via the driven sprocket 34 and transfer chain 36. FIG. 1 also illustrates that the road 15 provides a direct connection between the wheels 17, 19 of the rear and front axles 16,18 to lock the planetary gear set 20 in the direct ratio.

Turning to FIG. 4, an alternative lever diagram 110 is shown in accordance with the invention. Like the embodiment of FIG. 1, the lever diagram 110 illustrates a transfer case 112 which receives an input 114 from a corresponding transmission and splits the torque selectively between the rear axle 116 and front axle 118. The simple planetary gear set 120 includes the sun gear 122, planet carrier 124, and ring gear 126.

The input 114 is continuously connected with the carrier 124, and the ring gear 126 is continuously connected with the rear axle 116. The sun gear 122 is selectively connectable with ground (i.e., the transmission housing or transfer case housing) through the clutch 128. The sun gear 122 is selectively connectable with the front axle 118 through the clutching arrangement 130, which includes the one-way clutch 131 connected in parallel with the dog clutch 133. FIG. 4 also illustrates that the road 115 provides a direct connection between the wheels 117, 119 of the rear and front axles 116,118 to lock the planetary gear set 120 in the 1:1 gear ratio.

The dog clutch 133 is applied by a PRNDL cable in park and reverse conditions, and released in neutral, drive and lower forward ratios. This allows the transmission to provide both the park and reverse functions internal to the transmission because the dog clutch 133 is able to carry torque in both directions and can "push or pull" the front axle 118 in the lever diagram of FIG. 4.

FIG. 5 shows a truth table indicating the conditions in which the clutches 128, 133, 131 of FIG. 4 are engaged (O=open, X=engaged). In the direct drive (speeds one-four), the one way clutch 131 is engaged, and the other clutches 128, 133 are disengaged. In this condition, the speeds one-four are determined inside the corresponding transmission, and the transfer case 112 divides the torque between the rear and front axles 116, 118 proportional to the ring gear to sun gear tooth ratio. In the overdrive condition (fifth speed), the clutch 128 is engaged and the clutches 131, 133 are disengaged. In this condition, the sun gear 122 is grounded, and the ring gear 126 and rear axle 116 rotate faster than the carrier 124 and input 114, resulting in the overdrive condition. In the park/reverse condition, the dog clutch 133 is engaged, and the clutches 128, 131 are disengaged. In this condition, the dog clutch 133 enables the sun gear 122 to "push or pull" the front axle 118 when the PRNDL cable engages the dog clutch 133 so that the park and reverse conditions are determined inside the transmission.

FIG. 6 shows a schematic stick diagram embodying the lever diagram of FIG. 4, wherein like reference numerals are used to describe like components from FIG. 4. As shown, the drive sprocket 132 rotates the driven sprocket 134 via the transfer chain 136 for driving the front axle 118. The dog clutch 133 is shown as a sleeve positioned in the "open" condition. The sleeve will move to the right, as viewed in FIG. 6, to close the clutch for park and reverse.

Accordingly, the simple planetary gear set 120 functions as a gear ratio producing device when the friction clutch 128 is engaged so that an overdrive condition is created, and as a center differential wherein the one-way clutch 131 or dog clutch 133 is engaged because the road connects the front axle 118 with the rear axle 116. By way of example, this design could use the planetary gear set, clutches, and one-way clutch from the existing General Motors transmission. This design has an advantage of the plate clutch being a clutch brake (non-rotating piston) and thus eliminating any concerns about rotating seal leakage allowing the clutch apply oil to enter the transfer case.

A disadvantage of this design is the inability to switch independently between lo-hi and two-wheel—drive-all-wheel drive. The system will only provide all-wheel drive in Lo (direct drive), and only provide two-wheel drive in Hi (overdrive). This should be acceptable because the vehicle does not need the traction of all-wheel drive in top gear. When extra traction is required, the powertrain will dynamically downshift the transfer case into direct drive which provides all-wheel drive. The proposed arrangement with the one-way clutch creates an advantage for shift quality, but does not allow engine braking in the direct (all-wheel drive) mode. The driver can achieve engine braking if the transmission is placed in a "manual" D3, D2 or D1 mode when the transfer case is shifted into overdrive (engine braking will only be available in two-wheel drive). The driver will not be able to obtain engine braking in the lowest gear (highest N/V ratio, i.e., highest engine speed/vehicle speed ratio), but this powertrain will provide three N/V ratios that will be more than adequate for engine braking. The extremely high first gear N/V ratio of a 6:1 overall ratio transmission would probably be too high to be of value to the driver.

The final drive ratio will need to increase (move toward underdrive) between 20% to 30% from the current values (top gear N/V ratio is expected to drop 5% to 15% for a 6:1 overall ratio power train). This change in final drive product mix could add some amount of investment or piece price;

however, the system allows an existing four-speed automatic transmission to be mated to a transfer case with slightly more content and provide the function of a five- (or six-) speed automatic transmission combined with a one-speed all-wheel drive (open center differential) transfer case, which may provide a substantial savings.

The invention provides reduced costs over the alternative of mating a five- or six-speed automatic transmission to a transfer case having a center differential.

FIG. 7 shows a specific embodiment of a transfer case 210. As shown, the input shaft 214 is connected with the carrier 224. The sun gear 222 is engageable via the friction clutch 223 with the transmission housing 225 (for grounding). The sun gear 222 is also selectively engageable with the drive sprocket 232 via the one-way clutch 227 or the dog clutch 229 for driving the front axle (not shown) through the transfer chain 231.

The ring gear 226 is continuously connected with the output shaft 227 for driving the rear axle (not shown).

While the best modes for carrying out the invention have been described in detail, those familiar with the art to which this invention relates will recognize various alternative designs and embodiments for practicing the invention within the scope of the appended claims. For example, a compound planetary gear set could be used, and the ring gear and sun gear connections to the front and rear axles would be swapped. Likewise, this invention allows the freedom to use different front and rear axle ratios to allow a simple planetary gear set with conventional ring to sun ratios to achieve different all-wheel drive front to rear torque split values and a different overdrive step size.

What is claimed is:

1. A planetary gear arrangement for a transfer case comprising:
   first, second and third planetary gear members;
   said first planetary gear member continuously connected with an input;
   said second planetary gear member continuously connectable with a rear axle;
   said third planetary gear member selectively connectable with a front axle through a clutching arrangement; and
   said third planetary gear member being selectively connectable with ground through a friction clutch;
   wherein said clutching arrangement comprises a one way clutch and dog clutch connected in parallel, said one way clutch and dog clutch being independently engageable;
   whereby the planetary gear arrangement functions as a gear ratio producing device when said friction clutch is engaged, and as a center differential when said clutching arrangement is engaged.

2. The planetary gear arrangement of claim 1, wherein said first planetary gear member comprises a carrier, said second planetary gear member comprises a ring gear, and said third planetary gear member comprises a sun gear.

3. The planetary gear arrangement of claim 1, wherein the planetary gear arrangement is operative as a center differential when said dog clutch or one way clutch is engaged.

4. The planetary gear arrangement of claim 1, wherein an overdrive ratio produced by engagement of the friction clutch is approximately 1.5:1.

5. A drive train for a vehicle comprising front and rear axles, and a transfer case having a simple planetary gear set including:
   a carrier continuously connected with an input;
   a ring gear continuously connected with the rear axle;
   a sun gear selectively connectable with the front axle through a clutching arrangement, wherein said clutching arrangement comprises a one way clutch and dog clutch connected in parallel, said one way clutch and dog clutch being independently engageable; and
   said sun gear being selectively connectable with ground through a friction clutch;
   whereby the simple planetary gear set functions as a gear ratio producing device when said friction clutch is engaged, and as a center differential when said clutching arrangement is engaged as a result of the connection of the rear axle with the front axle through a road surface upon which wheels supported by the front and rear axles rest.

6. The drive train of claim 5, wherein the planetary gear arrangement is operative as a center differential when said dog clutch or one way clutch is engaged.

7. The drive tram of claim 5, wherein an overdrive ratio produced by engagement of the friction clutch is approximately 1.5:1.

8. The drive train of claim 5, wherein the front and rear axles have different axle ratios.

9. A drive train for a vehicle comprising front and rear axles, and a transfer case with a simple planetary gear set including:
   a carrier continuously connected with an input;
   a ring gear continuously connected with the rear axle;
   a sun gear selectively connectable with the front axle through a clutching arrangement, wherein said clutching arrangement comprises a one way clutch and dog clutch connected in parallel, said one way clutch and dog clutch being independently engageable;
   said sun gear being selectively connectable with ground through a friction clutch;
   whereby the simple planetary gear set functions as a gear ratio producing device when said friction clutch is engaged, and as a center differential when said dog clutch or one way clutch is engaged as a result of the connection of the rear axle with the front axle through a road surface upon which wheels supported by the front and rear axles rest; and
   wherein an overdrive ratio produced by engagement of the friction clutch is approximately 1.5:1.

10. A two speed transfer ease connectable between a transmission and front and rear axles of a vehicle, the transfer case comprising:
    a single planetary gear set having a sun gear, a carrier and a ring gear which are operatively engaged with at least two clutches to alternatively function as a center differential or a gear ratio producing device between the transmission and the front and rear axles and
    wherein said at least two clutches include a one way clutch and dog clutch connected in parallel, said one way clutch and dog clutch being independently engageable.

11. The two speed transfer case of claim 10, wherein said sun gear is engageable with the front axle through a clutching arrangement of said at least two clutches, and said sun gear is connectable with ground through a friction clutch of said at least two clutches; and wherein the planetary gear set functions as a gear ratio producing device when said friction clutch is engaged, and as a center differential when said clutching arrangement is engaged.

* * * * *